United States Patent [19]

Griffen et al.

[11] Patent Number: 4,600,066
[45] Date of Patent: Jul. 15, 1986

[54] LOAD CELL APPARATUS

[75] Inventors: Neil C. Griffen, Columbus; Stephen A. Patoray, Dublin, both of Ohio

[73] Assignee: Reliance Electric Company, Cleveland, Ohio

[21] Appl. No.: 695,416

[22] Filed: Jan. 28, 1985

Related U.S. Application Data

[63] Continuation of Ser. No. 496,053, May 19, 1983, abandoned.

[51] Int. Cl.⁴ ........................... G01G 3/14; G01G 3/08
[52] U.S. Cl. ..................................... 177/211; 177/229; 73/862.65
[58] Field of Search .................. 177/211, 229, DIG. 9; 73/862.65

[56] References Cited

U.S. PATENT DOCUMENTS 3,123,166  3/1964  Schellentrager ............. 177/DIG. 9
4,506,746  3/1985  Lockery ............................... 177/211

FOREIGN PATENT DOCUMENTS 674463   11/1963  Canada ................................. 177/211
2929137  2/1981   Fed. Rep. of Germany ...... 177/211
107372   8/1979   Japan ................................ 73/862.65
124769   9/1979   Japan ................................ 73/862.65

Primary Examiner—E. A. Goldberg
Assistant Examiner—Patrick W. Foster
Attorney, Agent, or Firm—Roy F. Hollander

[57] ABSTRACT

A scale plate with one or more load cell structures formed integrally therewith. Each load cell includes a flexure beam with strain sensing means mounted thereon and a fixed end merging with the plate. A support member has a free end and another end that is fixed to and merges with the other end of the beam. The load is applied between the plate and the support member. The support member permits the point of load application to be selected for improved output response of the load cell. A second flexure beam may be provided to counter any torsion effects on the first mentioned beam. The beam and support member are formed by cutting slots in the scale plate.

12 Claims, 12 Drawing Figures

LOAD CELL APPARATUS

This application is a continuation of application Ser. No. 496,053, filed May 19, 1983, now abandoned.

BACKGROUND OF THE INVENTION

This invention relates to weighing apparatus incorporating half-bridge or full-bridge load cells and more particularly to such a weighing apparatus that is more economical to manufacture and has a lower profile than prior weighing apparatus of the same general type.

Half-bridge load cells include a pair of strain gages connected in series. Typically, the gages are mounted on a beam or other counterforce so that one gage responds to tensile and the other to compressive strain. To maximize the electrical output of the strain gages, it is desirable to apply the load to such a load cell at a point between the longitudinally spaced gages. This requires the use of a spacer and a bracket to allow the load point to be placed over the gaged beam.

For example, there is disclosed in U.S. Pat. No. 4,261,429 to Lockery a weighing apparatus in which a flexure beam is formed integrally with a plate at each of the four corners of the plate. A pair of strain gages is mounted on each of the beams. The load point for each of the load cells so formed is moved between the strain gages by means of a vertical spacer connected to the free end of the beam and a bracket connected to the spacer and extending parallel to the beam. The use of the spacers and brackets produces, in addition to increased cost, a higher profile weighing apparatus.

SUMMARY OF THE INVENTION

The present inventon provides weighing apparatus which substantially eliminates the disadvantages discussed above in prior weighing apparatus of the same general type.

In accordance with the present invention, there is provided a weighing apparatus including a plate defining a plane and a flexure beam substantially coplanar with the plate and having a fixed end connected thereto. A support member substantially coplanar with the beam is spaced laterally from the longitudinal axis of the beam and has a free end and an opposite end which is connected to the other end of the beam. Strain sensing means is mounted on the beam.

The support member coplanar with the beam permits the load on the beam to be positioned at a desired location with respect to the strain sensing means without the need for a spacer and bracket. A second beam may be provided to balance any torsion on the first beam. The beam and support member may be constructed integrally and/or may be integral with the plate. In that case, the beam and support member can be formed by cutting slots in the plate.

GENERAL DESCRIPTION

Figure 1:
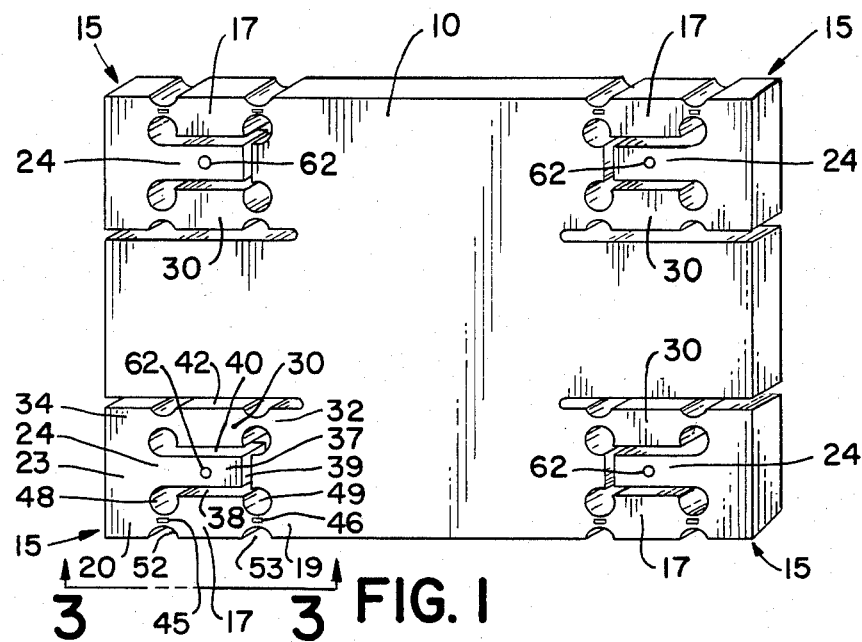
FIG. 1 is a perspective view of a weighing apparatus according to the present invention.
Figure 2:
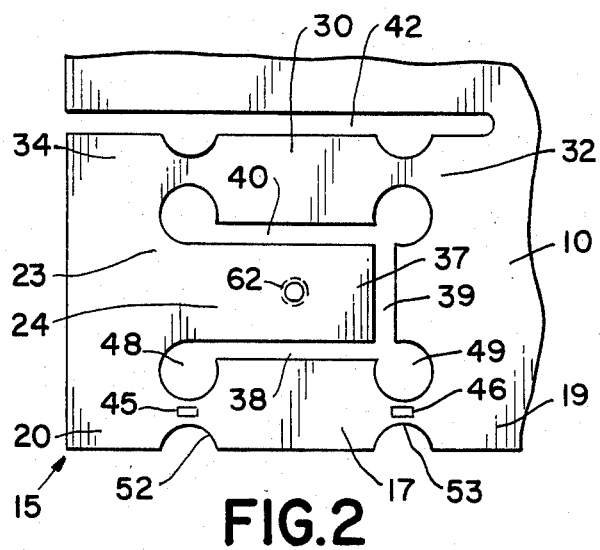
FIG. 2 is a plan view of one load cell of the apparatus of FIG. 1.
Figure 3:
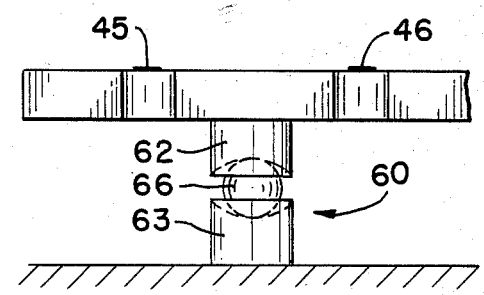
FIG. 3 is a side view along line 3—3 of FIG. 1.

Referring initially to FIGS. 1-3, there is shown a scale plate 10 of metal, for example, an aluminum alloy for low capacity scales and an alloy steel for scales of higher capacity. The thickness of plate 10 is preferably in the order of about 0.25 inches. Plate 10 is provided at each of its corners with an arrangement of slots and holes cut into the plate to define with it a load cell structure generally designated 15. Since all of the load cells are identical only one will be described in detail.

Each load cell 15 includes a flexure beam 17 having an end 19 fixed to and merging with plate 10 and another end 20 fixed rigidly to and merging with an end 23 of a support member 24. The load cell also includes a second beam 30 having an end 32 fixed to and merging with plate 10 and another end 34 fixed to and merging with end 23 of support member 24. Support member 24 also has a free end 37 defined by slots 38, 39 and 40 in plate 10. Flexure beam 30 is defined by slots 40 and 42.

Either or both of beams 17 and 30 may serve as the load sensing member of load cell 15 by providing strain gages thereon. In the exemplary embodiment illustrated in FIGS. 1-3, strain gages 45 and 46 are mounted only on beam 17 at reduced sections thereof formed by holes 48, 49 and cut-outs 52, 53 in the edges of plate 10. The reduced sections are not required but are often provided since they tend to improve the performance of load sensing members in which they are provided.

While flexure beams 17 and 30 and support member 24 are shown as formed integrally with plate 10 it is not necessary that this be so. Either or both beams or the support member may be rigidly fixed to plate 10 and/or to each other by other suitable means such as welding, adhesive or fasteners, for example, bolts and nuts.

As shown in FIG. 3, there extends from support member 24 a force transmitting means 60 which transmits force between the support member and a supporting surface. As shown, the force transmitting means includes a cup 62 suitably affixed to support member 24, a similar cup 63 adapted to rest upon a supporting surface and a ball 66 of the proper radius to be supported between cups 62 and 63. The ball and cup arrangement of force transmitting means 60 substantially eliminates the effects of side loading on the weighing apparatus. Force transmitting means 60 is preferably located on support member 24 between gages 45 and 46. An optimum point for the position of force transmitting means 60, along a line parallel to the longitudinal axis of beam 17, can be determined with a small amount of experimentation. The ball and cup arrangement shown for force transmitting means 60 is usually preferred because it substantially eliminates the effects of side loading. It is not necessary, however, and a rigid means or substantially any means capable of transmitting force between support member 24 and a support surface will suffice.

In operation, the strain gages 45, 46 on beam 17 are connected with the corresponding strain gages of the load cells 15 at the remaining corners of plate 10 to form one or more Wheatstone Bridge circuits in a known manner. A load or weight placed on plate on plate 10 produces an S-shaped bending pattern and tensile and compressive strains in each beam 17. The strains are sensed by strain gages 45 and 46 to produce an electrical signal at the bridge output proportional to the weight on plate 10.

Support member 24 permits the load on each load cell 15 to be applied between gages 45 and 46, but spaced transversely therefrom, without the need for a vertical spacer and bracket as required in prior art arrangements such as that shown in U.S. Pat. No. 4,261,429. The additional flexure beam 30, though not absolutely necessary, is of advantage in that it balances the torque applied to beam 17 as a result of the loading point being off-set transversely from the longitudinal axis of beam 17. Twisting of beam 17 and resulting torsional strain errors are thereby substantially eliminated. Since a vertical spacer and bracket are no longer required, a weighing scale utilizing plate 10 and load cells 15 may be lower in cost as well as having a lower profile than prior art arrangements. The lower profile permits such a scale to be used in applications where the prior art scale would not be satisfactory or desirable.

Figure 4:
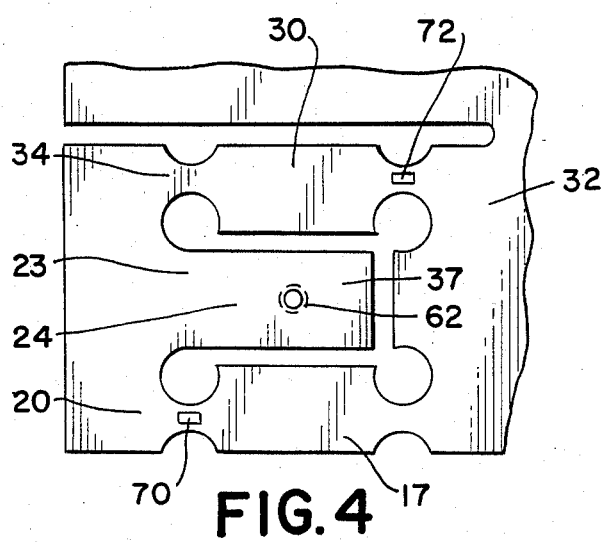
FIG. 4 is a plan view of the load cell of FIG. 2 illustrating an alternate placement of the strain gages.
Figure 5:
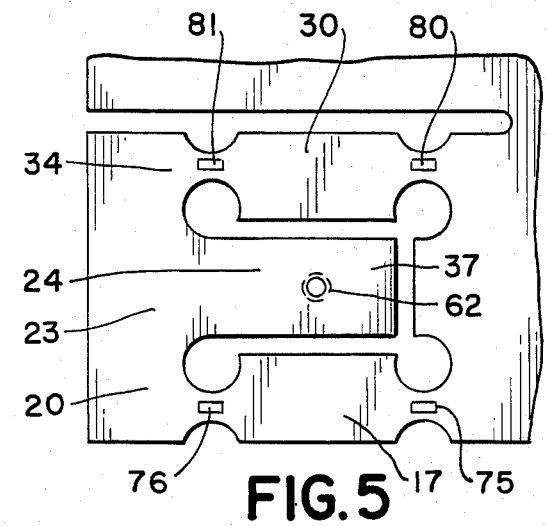
FIG. 5 is a plan view of the load cell of FIG. 2 illustrating another alternate placement of the strain gages.

FIGS. 4 and 5 show arrangements of load cell 15 in which both beams 17 and 30 are used as load responsive members. In FIG. 4, one strain gage 70 is mounted on a reduced section of beam 17 adjacent end 20 and another gage 72 is mounted on a reduced section of beam 30 adjacent its fixed end 32.

In FIG. 5, both beam 17 and beam 30 are provided with pairs of longitudinally spaced strain gages, identified as 75, 76 on beam 17 and 80, 81 on beam 30. The load cells becomes dual rather than single beam and full-bridge rather than half-bridge load cells.

Figure 6:
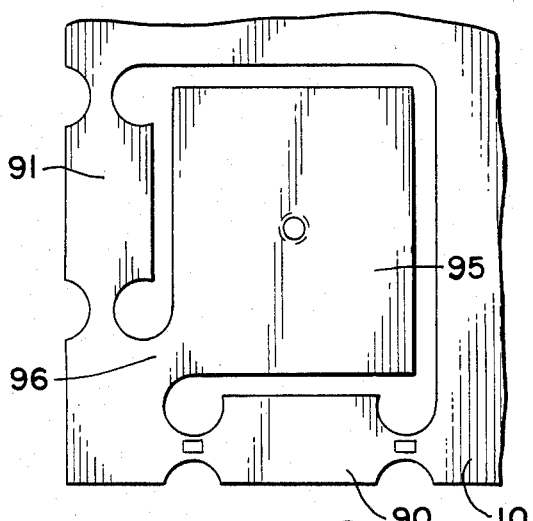
FIG. 6 is a partial plan view of another embodiment of weighing apparatus according to this invention.
Figure 7:
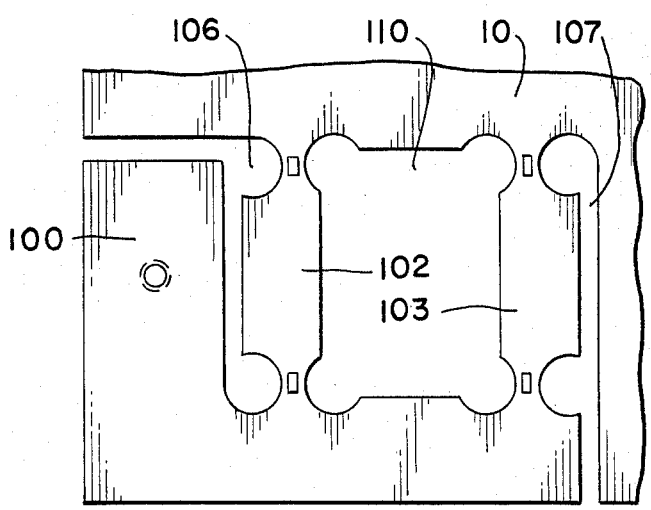
FIG. 7 is a partial plan view of still another embodiment of weighing apparatus according to this invention.
Figure 8:
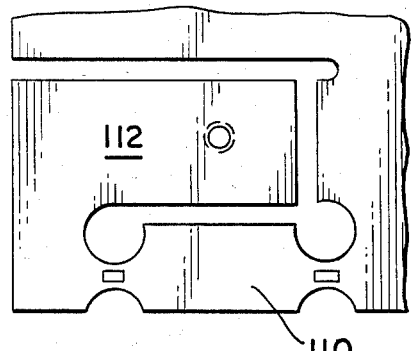
FIG. 8 is a partial plan view of yet another embodiment of weighing apparatus according to this invention.

FIGS. 6 to 8 illustrate alternate designs of the flexure beam and support member arrangement. In FIG. 6, beam members 90 and 91 are formed on mutually perpendicular edges of plate 10 and support member 95 merges at one corner 96 with the common merged ends of beams 90 and 91.

In FIG. 7, support member 100 is formed at an edge of plate 10 with beams 102 and 103 formed adjacent thereto by slots 106 and 107 and rectangular cut-out portion 110.

The alternate embodiments of FIGS. 6 and 7 operate in substantially the same manner as the embodiment of FIGS. 1 to 3. Either or both of the flexure beams may be provided with strain gages as described above.

In FIG. 8, only one flexure beam 110 is provided along with support member 112. The absence of a second flexure beam such as beam 30 in FIG. 2 results in a slight cost reduction and a reduction in performance from the absence of the torque balancing effect.

Figure 9:
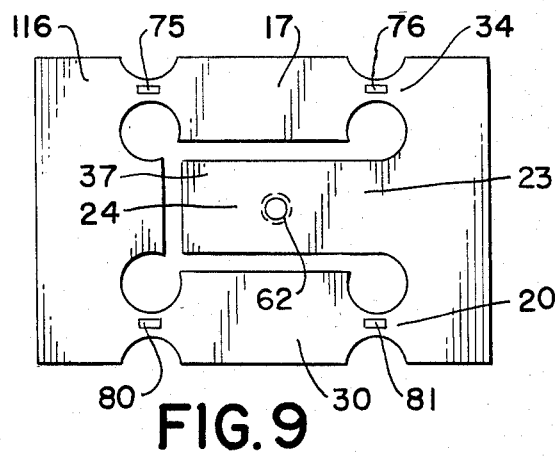
FIG. 9 is a plan view of weighing apparatus according to this invention incorporating only a single load cell.

FIG. 9 illustrates an embodiment of the invention in which a plate 116 is provided with only a single load cell, the load cell shown being that of FIG. 5. The single load cell includes beams 17 and 30 and support member 24. The flexure beam 17 is provided with strain gages 75, 76 while beam 30 is provided with gages 80 and 81. Other load cell configurations, either half-bridge or full-bridge, could, of course, be used as the single load cell with plate 116. The embodiment of FIG. 9, can, in certain circumstances, be used alone as the major part of scale mechanism. In other applications, plate 116 could be joined or affixed rigidly to other plate and load cell arrangements to provide different configurations of weighing mechanisms.

Figure 10:
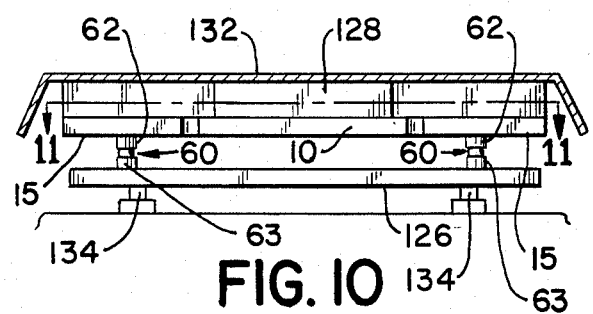
FIG. 10 is a side view of a scale mechanism embodying weighing apparatus according to this invention.
Figure 11:
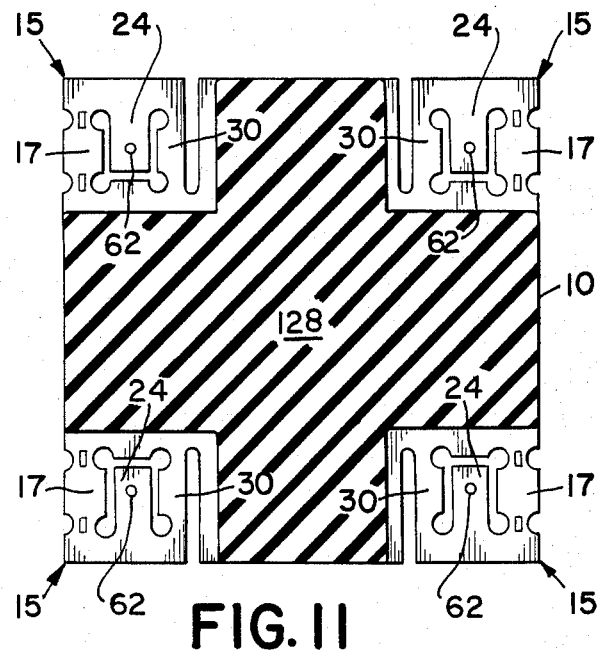
FIG. 11 is a sectional view along line 11—11 of FIG. 10.

FIGS. 10 and 11 illustrate the embodiment of FIGS. 1 to 3 in a scale mechanism. The plate 10 with four half-bridge load cells 15 is supported on a base 126 by force transmitting means 60 extending from the support member 24 of each load cell. A resilient shock pad 128 made of an elastomeric or other suitable material is placed over plate 10 with the portions over the load cells 15 removed as shown in FIG. 11 to confine the load to plate 10. A protective cover 132 of aluminum, for example, is provided over the shock pad. Base plate 126 is provided with a number (usually four) of feet 134 which support the scale mechanism on the surface on which it will be used. Base plate 126 is of advantage in that it provides a constant or invariable supporting surface for the load cells and the force transmitting means 60. Base plate 126 and feet 134 are of particular advantage when the scale may be moved from place to place and used on different supporting surfaces. The base plate and feet, along with the shock pad and cover, also serve to protect the scale from mishandling and abuse.

The positions of feet 134 with respect to the gaged beams 17 (and/or beams 30 when they are gaged) affects the performance of the scale. The first approach to obtaining optimum performance is to position the respective feet 134 directly beneath the gaged beams 17 (or 30) between the strain gages on the beams. When both beams 17 and 30 are gaged, the respective feet should be positioned between the beams and between the gages. Other locations may, however, prove more beneficial and a small amount of experimentation should determine the optimum locations for the feet in different scale configurations.

Figure 12:
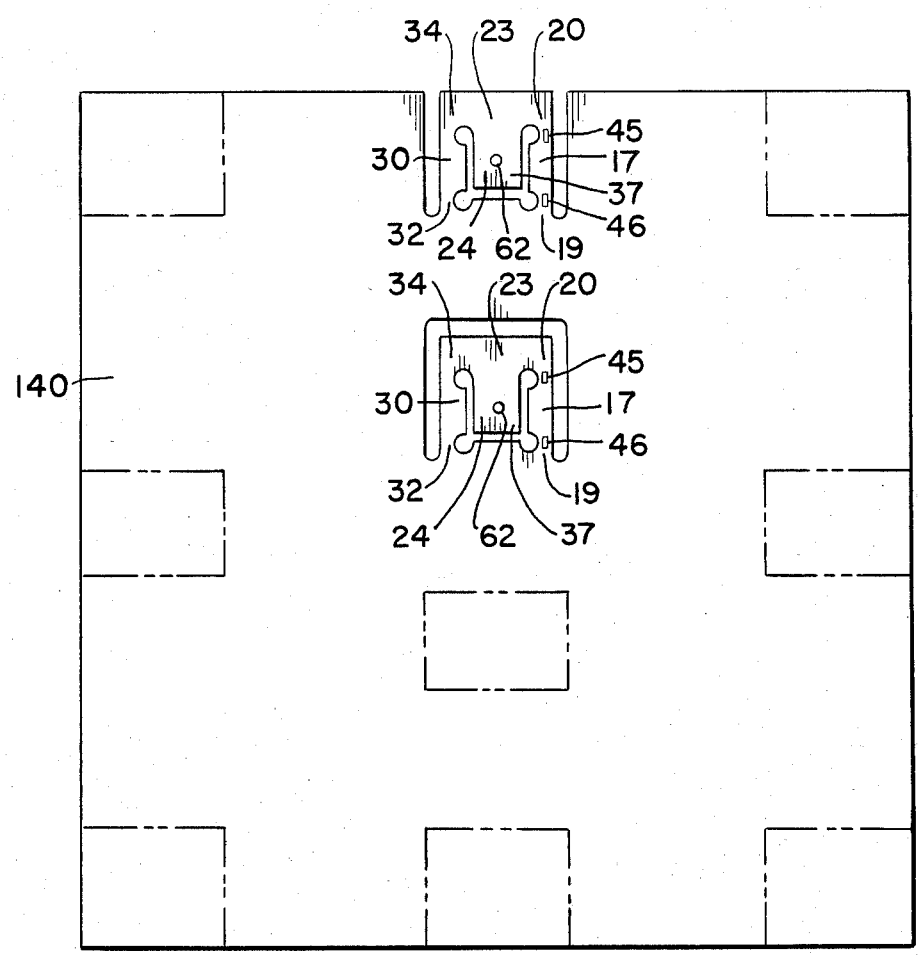
FIG. 12 is a plan view of a large area weighing apparatus according to the present invention.

In FIG. 12 there is shown a plate 140 of large area and having a multiplicity of load cells of the design of FIG. 2 formed therein, in the body and sides of the plate as well as at the corners. The embodiment of FIG. 12 could be used in, for example, truck scales or other applications requiring a substantial number of load cells distributed over a relatively large area.

Any adjustment required for off-center loading in a weighing mechanism according to the present invention can be accomplished in accordance with the procedures described in copending U.S. patent application Ser. No. 408,830, filed Aug. 17, 1982.

What is claimed is:

1. Weighing apparatus comprising a base plate, foot means connected to said base plate, a transducer plate having a plurality of force transducer means formed integrally therein, each transducer means comprising first and second flexure beams and a support member formed in said transducer plate, said support member having a free end and having another end merging with an end of each beam, each beam having its other end merging with said transducer plate, strain sensing means on said first beam, said first and second flexure beams and support member being formed by a first slot in said transducer plate, a second slot in said transducer plate parallel to and spaced from said first slot, a third slot in said transducer plate at an angle to said first and second slots and connecting with at least one of said first and second slots, a fourth slot in said transducer plate, and force transmitting means between each of said support members and said base plate, said force transmitting means including a first cup connected to said support member, a second cup connected to said base plate and a ball adapted to fit between said first and second cups to permit limited relative movement of said cups in a direction parallel to the plane of said support member.

2. Weighing apparatus as claimed in claim 1 wherein said strain sensing means comprises a pair of longitudinally spaced strain gages and said force transmitting means is located on said support member between and spaced laterally from said strain gages.

3. Weighing apparatus as claimed in claim 1 wherein said second beam is parallel to said first beam.

4. Weighing apparatus as claimed in claim 1 wherein said support member is between said beams.

5. Weighing apparatus as claimed in claim 1 including strain sensing means on said second beam.

6. Weighing apparatus as claimed in claim 5 wherein said strain sensing means on one beam comprises a strain gage mounted on the beam adjacent its fixed end, and said strain sensing means on the other beam comprises a strain gage mounted on the other beam adjacent it other end.

7. Weighing apparatus as claimed in claim 6 wherein said strain sensing means on each of said first and second beams comprises a pair of longitudinally spaced strain gages mounted on each of said beams.

8. Weighing apparatus as claimed in claim 1 wherein said third slot extends substantially at right angles to said first and second slots.

9. Weighing apparatus as claimed in claim 8 wherein said transducer plate has an edge parallel to said first slot, said first slot and said transducer plate edge defining said first beam, said third slot joining said first and second slots and defining therewith said support member.

10. Weighing apparatus comprising a plate having a plurality of force transducers formed integrally therein, each transducer being formed by first and second spaced apart, parallel slots, a third slot extending from an edge of said plate substantially at right angles to said first and second slots and connecting with one of them, and a fourth slot extending from an edge of said plate substantially parallel to said first and second slots, said slots forming first and second flexure beams each merging at one end with said plate and a support member having a free end and another end merging with the other end of at least one of said first and second flexure beams, and strain sensing means on said first beam.

11. Weighing apparatus comprising a plate having a plurality of force transducers formed integrally therein, each transducer being formed by first and second spaced apart, parallel slots, a third slot at substantially right angles to said first and second slots and connecting with one of them, and a fourth slot parallel to said third slot and connecting with at least one of said first and second slots, said slots forming first and second flexure beams each merging at one end with said plate and a support member having a free end and another end merging with the other ends of said first and second flexure beams and strain sensing means on at least one of said beams.

12. Weighing apparatus as claimed in claim 10 including strain sensing means on said second beam.

* * * * *